United States Patent
Slater

(10) Patent No.: US 6,650,412 B1
(45) Date of Patent: Nov. 18, 2003

(54) THERMAL COMPENSATION FOR OPTICAL APPARATUS

(75) Inventor: Joseph B. Slater, Dexter, MI (US)

(73) Assignee: Kaiser Optical Systems, Ann Arbor, MI (US)

( * ) Notice: Subject to any disclaimer, the term of this patent is extended or adjusted under 35 U.S.C. 154(b) by 254 days.

(21) Appl. No.: 09/588,968

(22) Filed: Jun. 7, 2000

Related U.S. Application Data
(60) Provisional application No. 60/153,176, filed on Sep. 10, 1999.

(51) Int. Cl.[7] .............................. G01J 3/28; G02B 7/02
(52) U.S. Cl. ......................................... 356/328; 359/820
(58) Field of Search ................. 356/328, 244; 359/820, 808, 811, 819; 248/901, 550, 560, 636

(56) References Cited

U.S. PATENT DOCUMENTS

| | | | | |
|---|---|---|---|---|
| 3,697,151 A | * | 10/1972 | Skolnick et al. ............. | 359/280 |
| 4,060,315 A | * | 11/1977 | Heinz ........................... | 248/487 |
| 4,162,120 A | * | 7/1979 | Moreno ........................ | 359/820 |
| 4,190,325 A |   | 2/1980 | Moreno ........................ | 350/253 |
| 4,236,790 A |   | 12/1980 | Smith ........................... | 350/253 |
| 4,488,790 A | * | 12/1984 | Beecher ....................... | 351/156 |
| 4,506,951 A | * | 3/1985 | Yamada ........................ | 359/820 |
| 4,525,745 A |   | 6/1985 | Ghaem-Maghami et al. ........................... | 358/237 |
| 4,723,833 A | * | 2/1988 | Yamada ........................ | 359/820 |
| 4,733,945 A | * | 3/1988 | Bacich .......................... | 359/820 |
| 4,850,674 A | * | 7/1989 | Hasselskog .................. | 359/820 |
| 4,861,137 A |   | 8/1989 | Nagata ......................... | 350/253 |
| 4,919,519 A | * | 4/1990 | Fantozzi et al. ............. | 359/820 |
| 5,317,875 A | * | 6/1994 | O'Brien et al. ............... | 60/527 |
| 5,370,352 A | * | 12/1994 | Platus .......................... | 248/619 |
| 5,383,168 A | * | 1/1995 | O'Brien et al. ............. | 359/196 |
| 5,523,893 A | * | 6/1996 | Haas ............................ | 359/818 |
| 5,557,474 A |   | 9/1996 | McCrary ..................... | 359/820 |
| 5,644,396 A | * | 7/1997 | Hopkins, II ................. | 356/301 |
| 6,040,950 A | * | 3/2000 | Broome ....................... | 126/700 |
| 6,108,145 A | * | 8/2000 | McCrary ..................... | 359/820 |
| 6,229,657 B1 | * | 5/2001 | Holderer et al. ............ | 359/819 |
| 6,239,924 B1 | * | 5/2001 | Watson et al. ............... | 359/811 |

* cited by examiner

Primary Examiner—Zandra V. Smith
Assistant Examiner—Gordon J Stock
(74) Attorney, Agent, or Firm—Gifford, Krass, Groh, Sprinkle, Anderson & Citkowski, PC

(57) ABSTRACT

Reliable and economical passive thermal compensation in both focus (parallel to the optical axis) and lateral position (perpendicular to the optical axis) is disclosed for optical apparatus, including spectrographs. In the preferred embodiment, to maintain the position of the lens along the optical axis, two or more polymer spacers are used between the lens mount and a floating flange to which the lens is attached. The polymer spacers have a thermal coefficient of expansion such that when the temperature increases the lens is moved toward the detector array by the spacers to compensate for the normal increase of the lens-detector spacing with temperature. Flexure mounts, which bend by a predetermined amount in a known direction when the temperature changes, are preferably used to connect the lens mount to the floating plate, thereby moving the lens in a direction lateral to the optical axis. In the case of a spectrograph, this lateral motion maintains the positional stability of given spectral lines on their respective detector pixel elements.

22 Claims, 4 Drawing Sheets

THERMAL COMPENSATION FOR OPTICAL APPARATUS

REFERENCE TO RELATED APPLICATION

This application claims priority of U.S. provisional application Serial No. 60/153,176, filed Sep. 10, 1999, the entire contents of which are incorporated herein by reference.

FIELD OF THE INVENTION

This invention relates generally to spectrographs, and, in particular, to an improved optical configuration that includes means for passive thermal compensation.

BACKGROUND OF THE INVENTION

In optical systems that include multiple lenses or other elements, temperature changes may affect the relative positions of the elements due to thermal expansion or contraction. Other material properties, such as the refractive index of the elements, may also change with temperature.

In precision optical systems, these changes in position and properties can cause shifts of focal length, wavelength, or other parameters, reducing the accuracy of measurements made with such systems. As an example, the distance between a lens and a fixed image plane (such as a detector array) will typically increase with temperature due to expansion of mechanical parts holding the lens and the image plane. The focal length of the lens, however, typically does not change with temperature to the same extent as the change in distance. As a consequence, the image will not be in sharp focus but will be blurred at the image plane.

This problem has been addressed by a variety of techniques involving passive or active thermal compensation. For example, U.S. Pat. No. 4,190,325 to Moreno discloses a cylindrical configuration in which compensatory lens movement is provided by an arrangement of push rods and levers. This configuration is relatively complex, however, and would be expensive to manufacture.

U.S. Pat. No. 4,236,790 to Smith discloses an alternative cylindrical configuration in which concentric cylinders are separated by a material having a relatively large thermal coefficient of expansion. The separation material expands with temperature so that it moves the inner cylinder in a direction and by an amount to compensate for thermal expansion of the housing of an optical system. The configuration is relatively complicated, requiring several concentric cylinders and provision for accurate guiding of linear relative motion between two of the cylinders.

In U.S. Pat. No. 4,525,745, Ghaem-Maghami et al disclose the use of bimetal rings to move a lens element in a manner to compensate for thermal changes. The use of a bimetal strip is also shown by Ghaem-Maghami et al, but the strip is shown constrained at both ends, which would negate the advantages of its being bimetallic. Bimetallic strips are typically constrained only at one end so that the other end is free to move when acted on by temperature changes.

U.S. Pat. No. 4,861,137 to Nagata discloses a mounting configuration that uses annular bimetallic elements to move a resin lens along its optical axis to compensate for thermally induced changes in the separation between a laser diode and its collimating lens. This approach requires a complicated mounting system and is limited to small lenses.

U.S. Pat. No. 5,557,474 to McCrary discloses still another approach for passive thermal compensation that uses materials with different thermal coefficients of expansion and angled interfaces to control movement as a function of temperature in a way that maintains fixed separation distances between optical elements. The McCrary patent further discloses the use of nested arrangements of the approach so as to control distances between elements within subgroups of optical elements while simultaneously controlling distances between the subgroups. Although this patent discloses a method for providing lateral movement in response to temperature changes, it appears susceptible to introducing tilt as well as pure lateral displacement.

Existing active thermal compensation techniques are typically more complex than passive techniques because of the requirement for sensors, electronic signal processors, and the active application of mechanical force. Such systems tend to be bulky, heavy, and expensive compared to passive thermal compensation designs.

In certain optical systems, it is necessary to control movements that are in a direction lateral to the optical axis. An instrument such as a spectrograph, for example, introduces folds into the optical path and as a result lateral movements of its optical elements caused by temperature changes may degrade its performance. FIG. 1 shows the configuration of a spectrograph in which the various optical components are mounted to a common base. Temperature changes cause the base plate to expand or contract, respectively increasing or decreasing the separation of the optical components in two dimensions. In addition to causing movements along the optical axis that defocus the spectra at the detector array, temperature changes also cause lateral movements that can shift the location on the detector array of a given spectral line. For example in a representative prior art spectrograph, temperature changes move spectral peaks across the face of the detector array by about 1 $\mu$m/° C. Such lateral movements reduce accuracy of spectral measurements made with the instrument. Prior art methods of compensating for the spectral shift required frequent calibration measurements that were time consuming and required the addition of calibration equipment.

There is a need, therefore, for a method of thermal compensation that provides both longitudinal and lateral movements of optical components to offset the effects of temperature changes in optical instruments. It is desirable that the method be simple and inexpensive to avoid adding unnecessary weight and cost to the instrument. Preferably the method should be one of passive thermal compensation.

SUMMARY OF THE INVENTION

This invention is directed to reliable and economical passive thermal compensation for optical apparatus, including spectrographs. The invention provides for such compensation in both focus (parallel to the optical axis) and lateral position (perpendicular to the optical axis).

Different embodiments ensure that a lens maintains a stable position relative to a detector array in the presence of temperature fluctuations. To maintain the position of the lens along the optical axis, two or more polymer spacers are used between the lens mount and a floating flange to which the lens is attached. The polymer spacers have a thermal coefficient of expansion such that when the temperature increases the lens is moved toward the detector array by the spacers to compensate for the normal increase of the lens-detector spacing with temperature.

As a separate aspect of this invention, which may or may not be used in conjunction with the polymer spacers, flexure mounts are used to connect the lens mount to the floating plate, preferably one on each side of the lens. Each flexure mount is part of a bimetallic strip that bends by a predetermined amount in a known direction when the temperature changes, thereby moving the lens in a direction lateral to the optical axis. In the case of a spectrograph, this lateral motion maintains the positional stability of given spectral lines on their respective detector pixel elements.

DETAILED DESCRIPTION OF THE INVENTION

Figure 1:
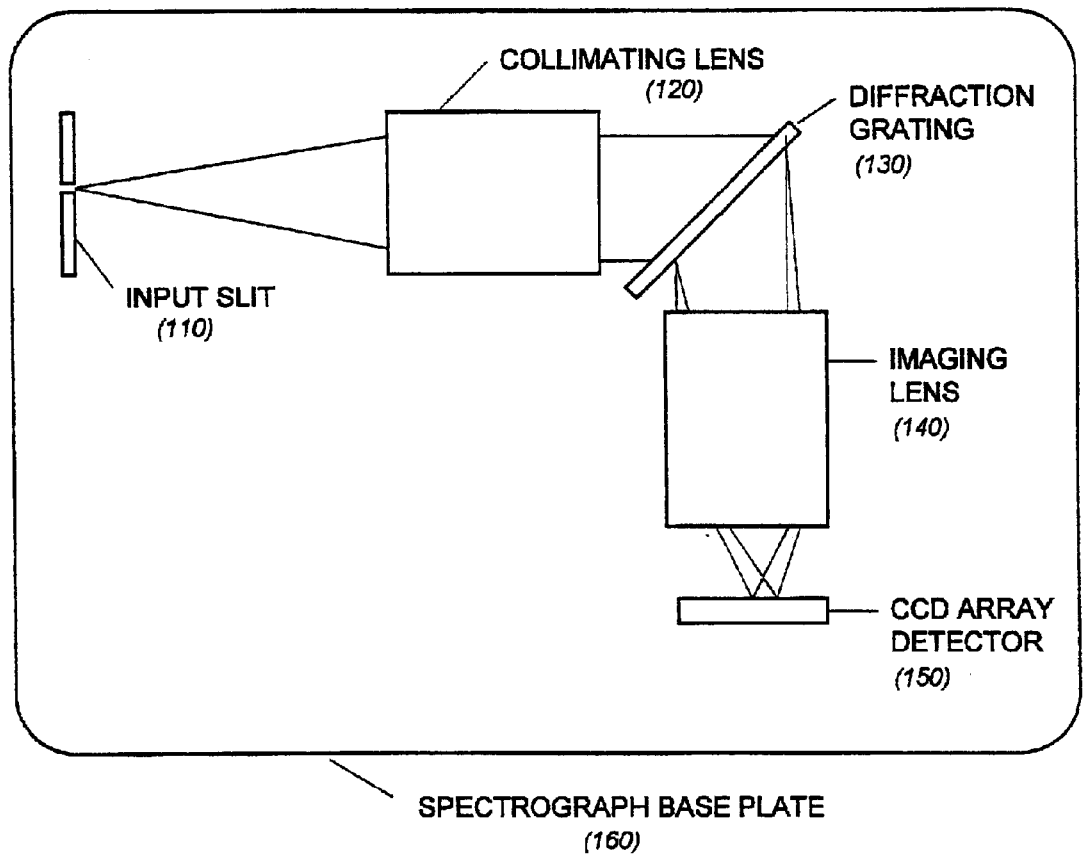
FIG. 1 illustrates an optical system that forms the basis of an optical spectrograph.

The prior-art optical system for a spectrograph as shown in FIG. 1 will be used as an illustrative example to describe the embodiments of the invention. The optical system 100 of the spectrograph includes an input slit 110, collimating lens 120, diffraction grating 130, imaging lens 140, and CCD detector array 150, all mounted onto a base plate 160, which is typically made of aluminum. The spectrograph has an optical axis 170 that is folded by the action of the grating 130, and it may be further folded by additional mirrors not shown in FIG. 1. The lens elements are typically color and aberration corrected, multi-element lenses. There may also be additional optics (not shown) to focus input light to the spectrograph onto the input slit. Alternatively, the input light may come from an optical fiber, which is placed against the slit or which replaces the slit since the diameter of the optical fiber may be comparable to a typical slit width. The detector array converts the optical output signal of the spectrograph into an electronic signal that is sent to an electronic processor (not shown).

An increase in temperature causes the base plate 160 to expand, which, without compensation, would move the optical components away from one another. As an example, it has been determined for a particular spectrograph design that a decrease of 0.5 $\mu$m in the distance between the imaging lens 140 and the detector array 150 is required to maintain accurate focus for an increase of 1° C. in temperature, compensating for both thermal changes in dimensions of the base plate and refractive index changes of the lens elements. Compensatory motion along the optical axis is therefore desirable to move the imaging lens toward the detector array to offset thermal changes in the base plate and lens caused by a temperature increase.

Similarly, temperature affects the distance between the input slit 110 and the collimating lens 120 as well as the properties of the collimating lens itself. The same method described above for the imaging lens can be applied to adjust the distance between the input slit and the collimating lens. In most applications, however, it is sufficient to provide focusing compensation at just one lens to correct for thermal effects at both lenses, including sufficient compensatory motion to account for axial thermal changes of the entire optical system.

Figure 2:
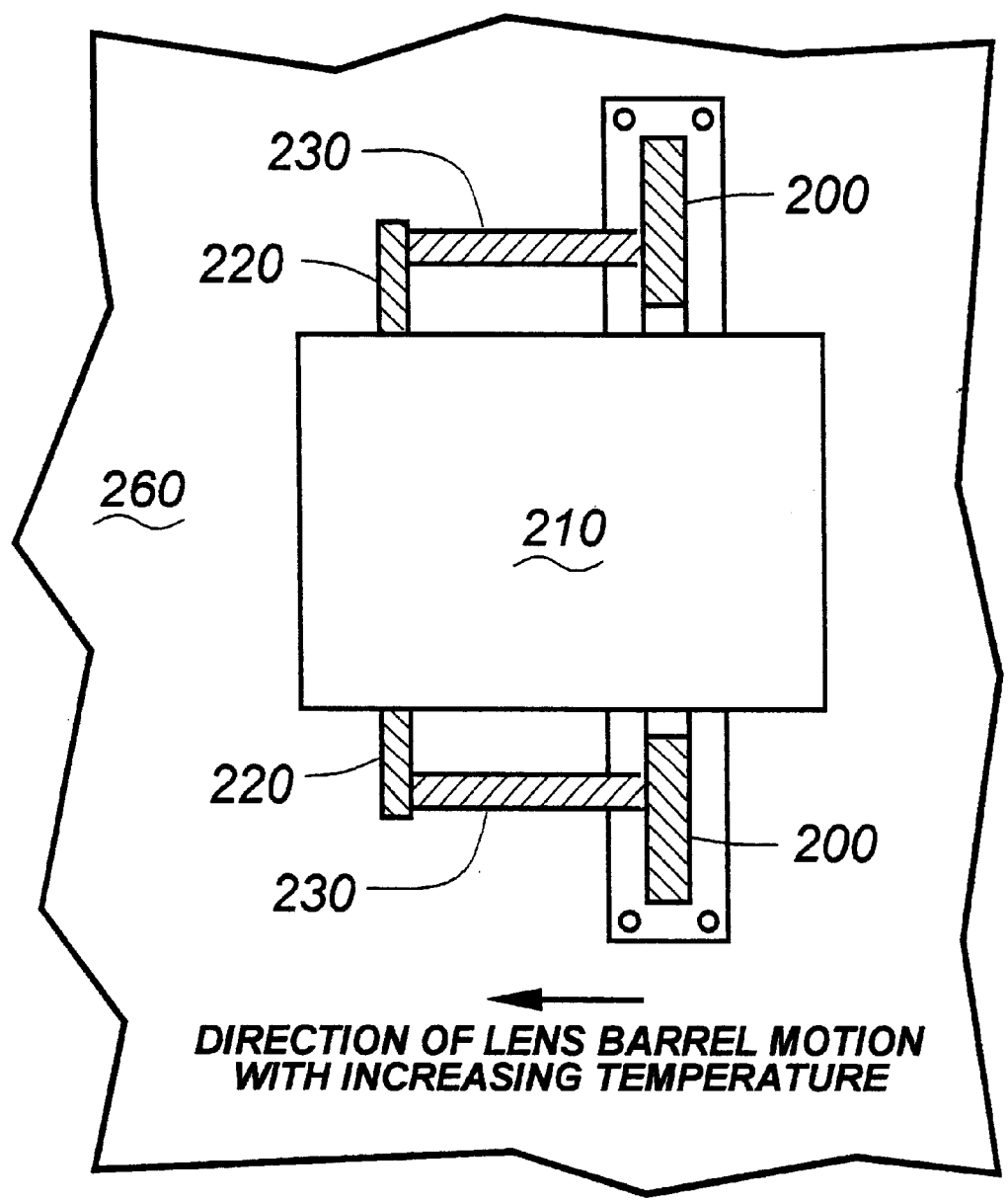
FIG. 2 illustrates a mounting arrangement for a lens that provides compensatory motion in a direction along the optical axis.

FIG. 2 illustrates the preferred method of mounting a lens to cause axial movement in a predetermined direction and amount to compensate for thermal effects. The figure shows an annular stationary mount 200, which is attached to a base plate 260. A floating flange 220 holds the lens, shown as an assembly mounted in a lens barrel 210. Polymer spacers 230 connect the floating flange to the stationary mount 200, which is shown in cross section. The polymer spacers can be made of a material such as cast Nylon 6. A temperature increase causes the lens to move in the direction indicated by the arrow relative to the base plate as the polymer spacers expand with the increase in temperature.

Applying the method shown in FIG. 2 to the imaging lens of FIG. 1, the lens 140 is mounted such that expansion of the polymer spacers 230 would move the lens toward the detector array 150 to compensate for the expansion of the base plate 160. The coefficient of thermal expansion of the polymer spacers is significantly greater than that of the base plate, which is typically made of aluminum. Consequently a relatively short polymer spacer provides sufficient movement to offset the thermal expansion of a greater length of aluminum such as that between the imaging lens 140 and the detector array 150 of FIG. 1. Typical values of the thermal coefficients of expansion for aluminum and Nylon 6 are 22 $\mu$m/m/° C. and 60 $\mu$m/m/° C., respectively.

The amount of compensatory movement D of the lens 140 is given by the product of the length L of the polymer spacers and the thermal coefficient of expansion $\alpha$ of the polymer, or $$D = \alpha L$$

ps As an example, for a length 30 mm of Nylon 6 polymer, which has a coefficient of expansion of 60 m/m/° C., the amount of movement per degree C. will be 1.8 $\mu$m. Of course it will be apparent to those skilled in the art that other materials with other coefficients of expansion may be selected instead of those used in the example.

Referring again to FIG. 1, it can be seen that expansion of the base plate 160 will also cause the imaging lens 140 to move in a direction that is lateral with respect to the optical axis at the imaging lens. Such motion moves the position of spectral peaks between pixel elements of the detector array, which could change the indicated wavelength of a particular peak as measured by the instrument. Consequently it is also necessary to provide compensation means that move the imaging lens laterally with respect to the optical axis.

While longitudinal movement is provided by the mounting technique described above, lateral movement is established through the use of a bimetallic flexure mount to create movement in a particular direction in response to temperature changes. Two materials with dissimilar coefficients of thermal expansion are selected to form the bimetallic mount.

Figure 3:
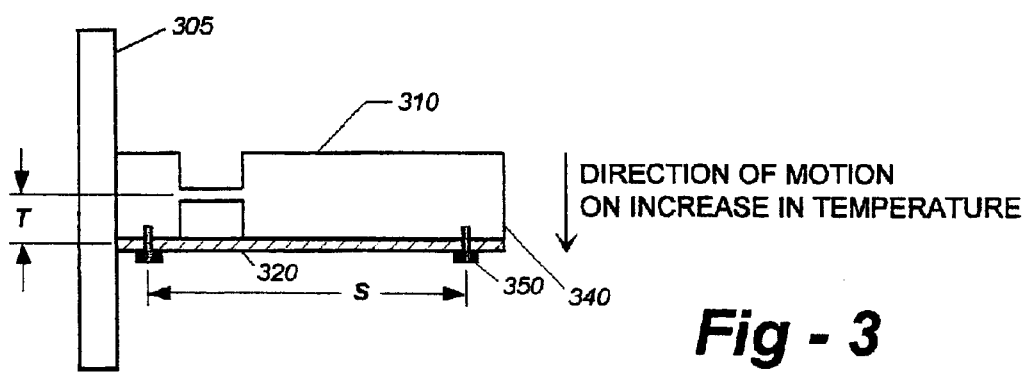
FIG. 3 illustrates a bimetallic flexure mount that can be used to provide compensatory motion in a direction perpendicular to the optical axis.

Now making reference to FIG. 3, a bimetallic flexure mount 300 attached to stationary mount 305 preferably comprises an aluminum flexure mount 310 with a thin strip of stainless steel 320 attached near each end of the aluminum piece. The flexure portion 330 of the aluminum piece permits bending in the plane of the figure while providing rigidity in other respects. When the temperature increases, the aluminum expands to a greater extent than the stainless steel strip, which causes the free end 340 of the mount to move by a predetermined amount in the direction indicated by the arrow. The amount of movement is a function of the length S between the attachment points 350 of the stainless steel strip, the separation T between the pivot points of the flexure mount and the stainless steel strip, and the difference in thermal coefficients of the aluminum and stainless steel. By proper choice of the particular materials used, the length S, and the separation T, it is straightforward to control the amount of movement induced by a given temperature change. Typical values of the thermal coefficients of expansion for aluminum and stainless steel are 22 $\mu$m/m/° C. and 10 m/° C., respectively. In addition, the stainless steel strip adds rigidity to the flexure mount structure with regard to bending in the plane of FIG. 3, so that bending occurs only in response to thermal changes, and in other respects the mount is mechanically strong and free of vibration.

Figure 4:
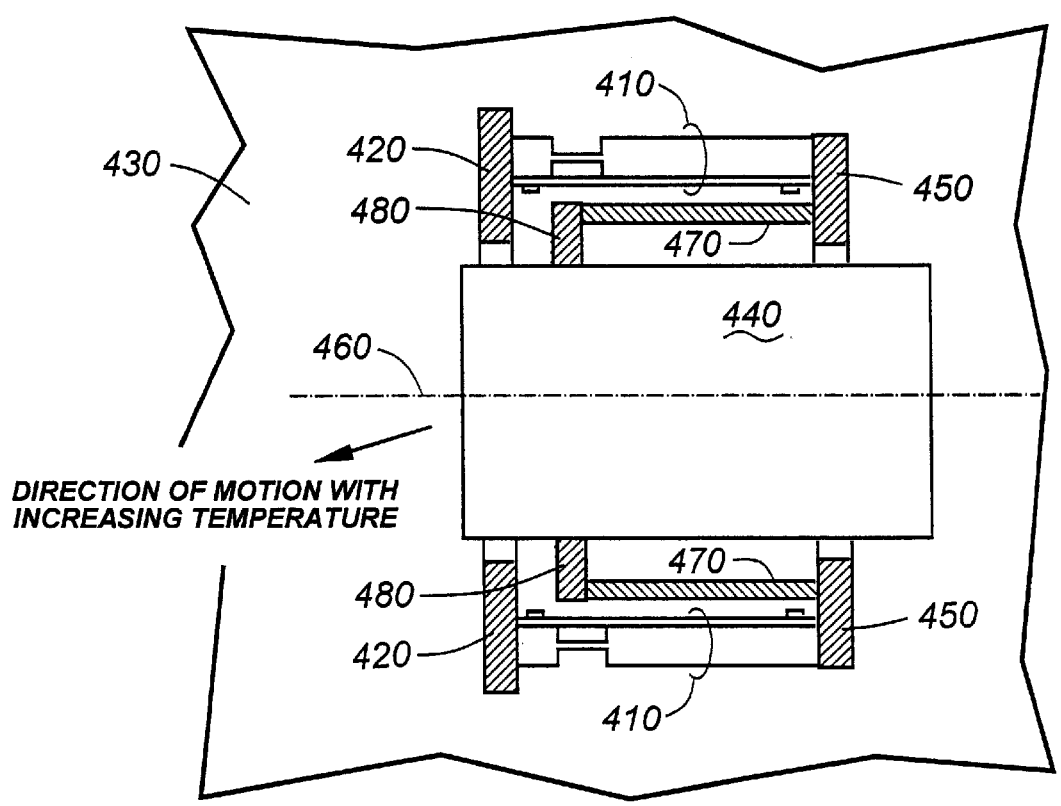
FIG. 4 is a cross sectional view of the preferred mounting configuration that provides passive thermal compensatory motion to a lens in a direction that is both parallel and perpendicular to the optical axis.

Although it is possible to provide longitudinal compensation at the collimating lens and lateral compensation at the imaging lens, in the preferred embodiment both longitudinal and lateral compensation are provided at the imaging lens. FIG. 4 shows a cross section view of the preferred embodiment of the compensation method that simultaneously moves a lens in directions that are both parallel and perpendicular to the optical axis passing through the lens. As illustrated in FIG. 4, bimetallic flexure mounts 410 are fastened to a stationary mount 420, which is attached to the base plate 430. The stationary mount is preferably rectangular with a circular opening to accommodate the movement of the lens barrel 440. A floating plate 450 is attached to the free end of the bimetallic flexure mounts; a change in temperature moves the floating plate 450 in a direction perpendicular to the optical axis 460. Polymer spacers 470 connect a floating flange 480 to the floating plate 450; a change in temperature moves the floating flange in a direction parallel to the optical axis. The floating flange 480 holds the lens barrel 440 in place. An increase in temperature will move the lens in the direction generally indicated by the arrow in FIG. 4. The amount of motion in each direction relative to the optical axis can be independently adjusted through the appropriate selection of materials and design parameters.

Figure 5:
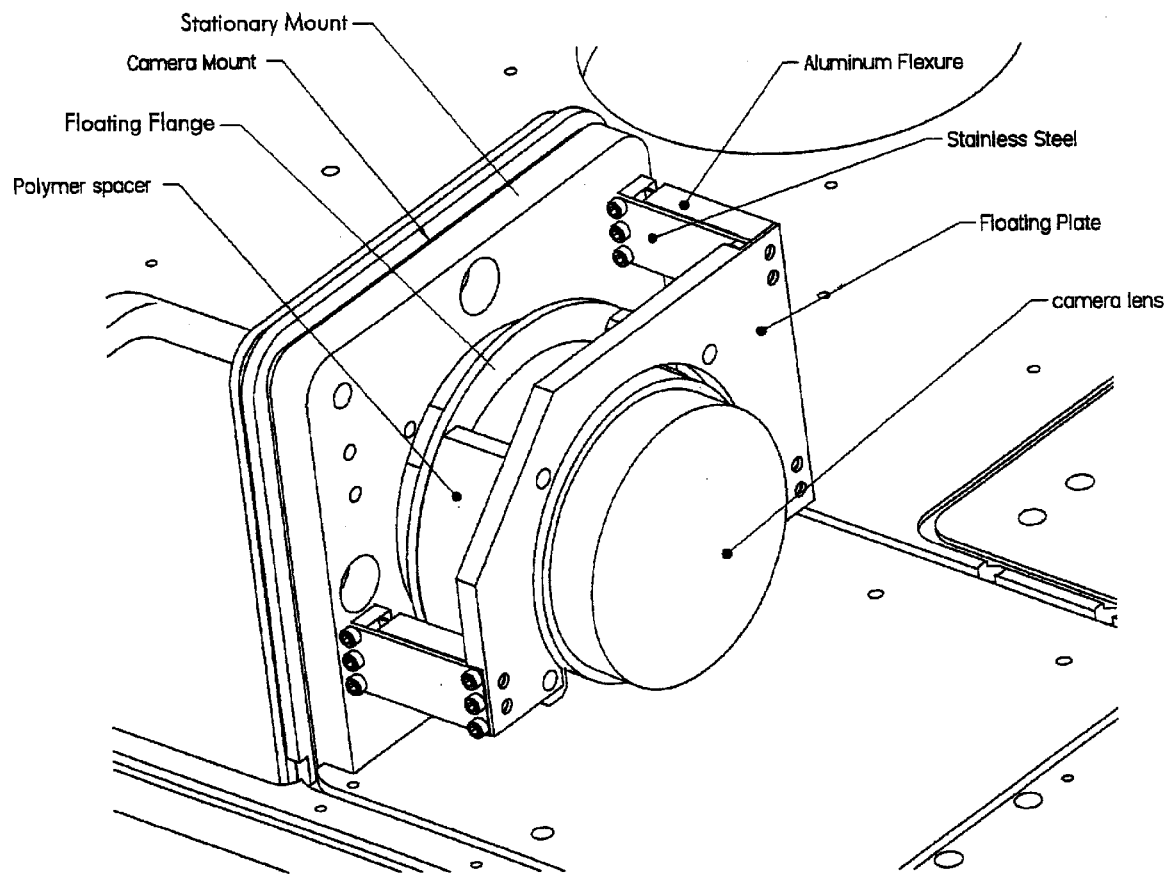
FIG. 5 is an oblique view of the preferred mounting configuration.

FIG. 5 shows an oblique representation of the preferred mount combining both longitudinal and lateral thermal compensation. While the mount shown in FIG. 5 moves the lens parallel to the plane of the base plate, the bimetallic flexure mounts could be located to introduce motion lateral to the optical axis in a direction perpendicular to the plane of the base plate should motion in that direction be required by the optical system. Alternatively the bimetallic flexure mounts could located as shown in FIG. 5 but rotated by 90 degrees to induce lateral motion that is perpendicular to the plane of the base plate. It should also be clear to those skilled in the art that the bimetallic flexure mounts could further be arranged to provide lateral motion at an arbitrary angle relative to the plane of the base plate as required to compensate thermal changes of the optical system in three dimensions.

I claim:

1. In a spectrograph of the type wherein at least one optical element aligned on an optical axis is used to direct optical spectra onto a detector plane, thermal compensation apparatus, comprising:
    a stationary mount;
    a floating plate physically coupled to the optical element; and
    two or more flexure mounts connecting the floating plate to the stationary mount, the flexure mounts being deformable as a function of temperature, thereby causing the optical element to move in a direction perpendicular the optical axis so as to minimize unwanted shifting of the optical spectra relative to the plane of the detector.

2. The apparatus of claim 1, wherein the flexure mounts include bimetallic strips.

3. The apparatus of claim 1, including two flexure mounts, one disposed on each side of the optical element.

4. The apparatus of claim 1, wherein the spectra is a Raman or fluorescence spectra.

5. The apparatus of claim 1, wherein the optical element is a lens.

6. The apparatus of claim 5, wherein:
    the spectrograph includes a diffraction grating and an imaging lens between the grating and the detector; and
    the flexure mounts adjust the imaging lens.

7. The apparatus of claim 1, wherein the floating plate is physically coupled to the optical element as follows:
    a floating flange to which the optical element is attached; and
    two or more spacers connecting the floating flange to the floating plate, the spacers having a thermal coefficient of expansion causing the optical element to move in a direction parallel to the optical axis in response to a change in temperature.

8. The apparatus of claim 7, wherein the spacers are polymeric.

9. In a spectrograph of the type wherein at least one optical element aligned on an optical axis is used to direct optical spectra onto a detector plane, thermal compensation apparatus, comprising:
    a stationary mount;
    a floating flange connected to the optical element; and
    two or more spacers physically coupling the floating flange to the stationary mount, the spacers having a thermal coefficient of expansion causing the optical element to move in a direction parallel to the optical axis to compensate for the normal increase in optical element-detector spacing that arises with temperature increases.

10. The apparatus of claim 9, wherein the spacers are polymeric.

11. The apparatus of claim 9, including two spacers, one disposed on each side of the optical element.

12. The apparatus of claim 9, wherein the spectra is a Raman or fluorescence spectra.

13. The apparatus of claim 9, wherein the optical element is a lens.

14. The apparatus of claim 13, wherein:
    the spectrograph includes a diffraction grating and an imaging lens between the grating and the detector; and
    the flexure mounts adjust the imaging lens.

15. The apparatus of claim 9, wherein the floating flange is physically coupled to the stationary mount as follows:
    a floating plate to which the optical element is attached; and
    two or more flexure mounts connecting the floating plate to the floating flange, the flexure mounts being deformable as a function of temperature, thereby causing the optical element to move substantially perpendicular to the optical axis.

16. The apparatus of claim 15, wherein the flexure mounts comprise bimetallic strips.

17. In a spectrograph of the type wherein at least one optical element aligned on an optical axis is used to focus spectral lines onto a plurality of detector pixel elements, thermal compensation apparatus, comprising:
    a stationary mount;
    a floating plate;
    a floating flange to which the optical element is attached;
    two or more first temperature-sensitive elements connecting the floating plate to the stationary mount, the first elements being operative to bend a predetermined amount in the presence of temperature fluctuations, thereby maintaining the positional stability of given spectral lines on their respective detector pixel elements; and two or more second temperature-sensitive elements connecting the floating flange to the floating plate, the second elements have a thermal coefficient of expansion such that when the temperature increases, the optical element is moved toward the detector to compensate for the normal increase in optical element-detector spacing that arises with temperature increases.

18. The apparatus of claim 17, wherein the first temperature-sensitive elements are bimetallic strips.

19. The apparatus of claim 17, wherein the second temperature-sensitive elements are polymeric spacers.

20. The apparatus of claim 17, wherein the spectra is a Raman or fluorescence spectra.

21. The apparatus of claim 17, wherein the optical element is a lens.

22. The apparatus of claim 21, wherein:

the spectrograph includes a diffraction grating and an imaging lens between the grating and the detector; and the flexure mounts adjust the imaging lens.

* * * * *